United States Patent
Arise et al.

(10) Patent No.: US 10,476,063 B2
(45) Date of Patent: Nov. 12, 2019

(54) NONAQUEOUS ELECTROLYTE SECONDARY BATTERY INSULATING POROUS LAYER AND NONAQUEOUS ELECTROLYTE SECONDARY BATTERY LAMINATED SEPARATOR

(71) Applicant: Sumitomo Chemical Company, Limited, Tokyo (JP)

(72) Inventors: Ichiro Arise, Osaka (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/356,919

(22) Filed: Nov. 21, 2016

(65) Prior Publication Data

US 2017/0155106 A1 Jun. 1, 2017

(30) Foreign Application Priority Data

Nov. 27, 2015 (JP) .................................. 2015-232154

(51) Int. Cl.
*H01M 2/16* (2006.01)
*H01M 2/14* (2006.01)
*H01M 10/0525* (2010.01)

(52) U.S. Cl.
CPC ......... *H01M 2/166* (2013.01); *H01M 2/1686* (2013.01); *H01M 2/14* (2013.01); *H01M 2/16* (2013.01); *H01M 10/0525* (2013.01); *H01M 2220/30* (2013.01)

(58) Field of Classification Search
CPC .......... H01M 2/14; H01M 2/16; H01M 2/166; H01M 2/1686
See application file for complete search history.

(56) References Cited

U.S. PATENT DOCUMENTS

| 6,627,346 | B1 | 9/2003 | Kinouchi et al. | |
|---|---|---|---|---|
| 2004/0166407 | A1 | 8/2004 | Nakajima et al. | |
| 2008/0070107 | A1 | 3/2008 | Kasamatsu et al. | |
| 2009/0053609 | A1* | 2/2009 | Minami | H01M 4/13 429/232 |
| 2010/0227207 | A1 | 9/2010 | Fukumoto et al. | |
| 2010/0261069 | A1 | 10/2010 | Nakura | |
| 2011/0027658 | A1 | 2/2011 | Kim et al. | |
| 2011/0144368 | A1 | 6/2011 | Weiner et al. | |
| 2012/0077074 | A1* | 3/2012 | Hoshina | C01G 23/005 429/149 |
| 2013/0084503 | A1 | 4/2013 | Ueki et al. | |
| 2013/0252066 | A1 | 9/2013 | Yeou et al. | |
| 2014/0045033 | A1 | 2/2014 | Zhang et al. | |
| 2014/0147744 | A1* | 5/2014 | Nemoto | H01M 4/136 429/211 |
| 2014/0370358 | A1* | 12/2014 | Hong | H01M 10/052 429/126 |

FOREIGN PATENT DOCUMENTS

| CN | 101989651 A | 3/2011 |
|---|---|---|
| CN | 103199301 A | 7/2013 |
| CN | 103413966 A | 11/2013 |
| CN | 104269505 A | 1/2015 |
| CN | 104521028 A | 4/2015 |
| JP | 2002-025531 A | 1/2002 |
| JP | 2004-273437 A | 9/2004 |
| JP | 2005-196999 A | 7/2005 |
| JP | 2009070797 A | 4/2009 |
| JP | 2009-146822 A | 7/2009 |
| JP | 2010-118211 A | 5/2010 |
| JP | 4476254 B2 | 6/2010 |
| JP | 2012500213 A | 1/2012 |
| JP | 201274133 A | 4/2012 |
| JP | 201541502 A | 3/2015 |
| KR | 2007-0013840 A | 1/2007 |
| KR | 10-0777971 B1 | 11/2007 |
| KR | 2013-0107550 A | 10/2013 |
| WO | 2006/061936 A1 | 6/2006 |
| WO | 2011/158335 A1 | 12/2011 |

OTHER PUBLICATIONS

Office Action dated Mar. 21, 2017 in JP Application No. 2016128158.
Office Action dated Sep. 20, 2016 in JP Application No. JP2016-128158.
Office Action dated Jul. 28, 2016 in KR Application No. 10-2016-76986.
Office Action dated Nov. 27, 2017 in CN Application No. 2016-11059129.5.
Office Action dated Jun. 20, 2018 in CN Application No. 201611059129.5.
Office Action dated Jan. 18, 2019 in CN Application No. 201611059129.5.

* cited by examiner

*Primary Examiner* — Jeremiah R Smith

(74) *Attorney, Agent, or Firm* — Panitch Schwarze Belisario & Nadel LLP

(57) ABSTRACT

Provided as a nonaqueous electrolyte secondary battery insulating porous layer that allows a nonaqueous electrolyte secondary battery to have an improved discharge output characteristic is a nonaqueous electrolyte secondary battery insulating porous layer containing fine particles of a metal salt having a Lewis acid peak area within a range of not less than 0.2 $g^{-1}$ and not more than 3.6 $g^{-1}$ per unit weight, the Lewis acid peak area being measured by an infrared spectroscopy-based acid nature evaluation method for a solid surface, the Lewis acid peak area of a metal salt per unit weight being defined as a value resulting from dividing (i) the area of a peak present in a region of 1447 $cm^{-1}$ to 1460 $cm^{-1}$ of an infrared absorption spectrum measured of a sample on which pyridine was adsorbed and from which the pyridine has then been desorbed by (ii) the weight of the metal salt.

20 Claims, 1 Drawing Sheet

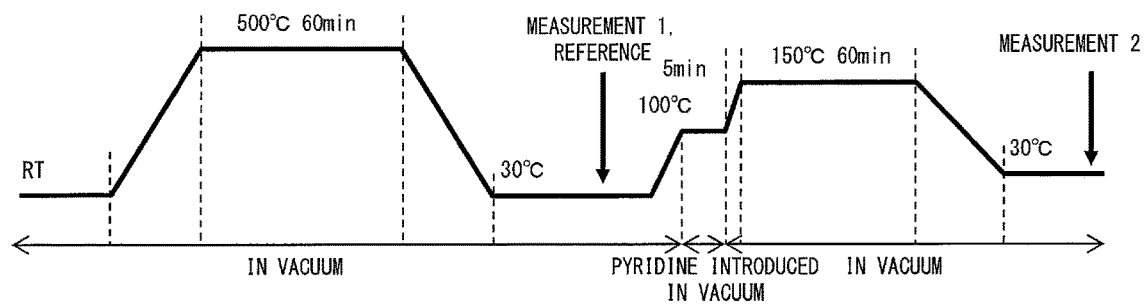

NONAQUEOUS ELECTROLYTE SECONDARY BATTERY INSULATING POROUS LAYER AND NONAQUEOUS ELECTROLYTE SECONDARY BATTERY LAMINATED SEPARATOR

This Nonprovisional application claims priority under 35 U.S.C. § 119 on Patent Application No. 2015-232154 filed in Japan on Nov. 27, 2015, the entire contents of which are hereby incorporated by reference.

TECHNICAL FIELD

The present invention relates to an insulating porous layer for a nonaqueous electrolyte secondary battery (hereinafter referred to as "nonaqueous electrolyte secondary battery insulating porous layer") and a laminated separator for a nonaqueous electrolyte secondary battery (hereinafter referred to as "nonaqueous electrolyte secondary battery laminated separator").

BACKGROUND ART

Nonaqueous electrolyte secondary batteries, particularly lithium secondary batteries, have high energy density and are thus in wide use as batteries for personal computers, mobile telephones, portable information terminals, and the like.

Nonaqueous electrolyte secondary batteries, typically lithium secondary batteries, have high energy density. Nonaqueous electrolyte secondary batteries let a large current flow and thus generate intense heat in the event of an accident such as a breakage of the battery or a breakage of the device using the battery has caused an internal short circuit or external short circuit. Nonaqueous electrolyte secondary batteries are thus required to prevent more than a certain level of heat generation to ensure a high level of safety.

Such a high level of safety is ensured typically by a method of imparting to the nonaqueous electrolyte secondary battery a shutdown function, which is a function of a separator blocking passage of ions between the anode and the cathode in the event of abnormal heat generation to prevent further heat generation. The shutdown function may be imparted to a separator by, for example, a method of using, as the separator, a porous film made of a material that is meltable in the event of abnormal heat generation. A battery including such a separator allows the porous film to be melted and made non-porous in the event of abnormal heat generation to block the ion passage for prevention of further heat generation.

Examples of a separator having such a shutdown characteristic (i) include a separator in the form of a porous layer including a mixture of an inorganic filler and a binder polymer and (ii) a laminated separator in the form of a laminated body including a porous base material and the above porous layer disposed on the porous base material.

There has been proposed a separator including various kinds of fine metal salt particles as the inorganic filler (see Patent Literature 1). There have also been proposed (i) a separator including, as the fine metal salt particles, fine particles made of magnesium oxide (see Patent Literature 2) and (ii) a separator including, as the fine metal salt particles, fine particles made of alumina and/or magnesium oxide (see Patent Literature 3).

CITATION LIST

Patent Literature

[Patent Literature 1]
Japanese Patent Application Publication, *Tokukai*, No. 2005-196999 A (Publication Date: Jul. 21, 2005)
[Patent Literature 2]
U.S. Pat. No. 4,476,254 (Issue Date: Jun. 9, 2010)
[Patent Literature 3]
Japanese Patent Application Publication, *Tokukai*, No. 2009-146822 A (Publication Date: Jul. 2, 2009)

SUMMARY OF INVENTION

Technical Problem

The above separator for a nonaqueous electrolyte secondary battery (hereinafter referred to as "nonaqueous electrolyte secondary battery separator") including a known porous layer and the above nonaqueous electrolyte secondary battery laminated separator including the porous layer have unfortunately yet to achieve a sufficient discharge output characteristic.

Solution to Problem

In order to solve the above problem, the inventors of the present invention have discovered that controlling the Lewis acidity of an inorganic filler in an insulating porous layer as a member of a nonaqueous electrolyte secondary battery or nonaqueous electrolyte secondary battery laminated separator allows for improvement in the discharge output characteristic of (i) a nonaqueous electrolyte secondary battery including the insulating porous layer integrated therein as a separator or (ii) a nonaqueous electrolyte secondary battery including, integrated therein, a nonaqueous electrolyte secondary battery laminated separator including a porous film and the insulating porous layer on one or both surfaces of the porous film. The inventors have thus arrived at the present invention.

Specifically, the present invention is a nonaqueous electrolyte secondary battery insulating porous layer, a nonaqueous electrolyte secondary battery laminated separator, a member for a nonaqueous electrolyte secondary battery (hereinafter referred to as "nonaqueous electrolyte secondary battery member"), and a nonaqueous electrolyte secondary battery each described later.

A nonaqueous electrolyte secondary battery insulating porous layer of an embodiment of the present invention is an insulating porous layer for a nonaqueous electrolyte secondary battery, the insulating porous layer including a fine particle of a metal salt, the metal salt having a Lewis acid peak area within a range of not less than 0.2 $g^{-1}$ and not more than 3.6 $g^{-1}$ per unit weight, the Lewis acid peak area being measured by an infrared spectroscopy-based acid nature evaluation method for a solid surface, a Lewis acid peak area of a metal salt per unit weight being defined as a value resulting from dividing (i) an area of a peak present in a region of 1447 $cm^{-1}$ to 1460 $cm^{-1}$ of an infrared (IR) absorption spectrum measured of a sample on which pyridine was adsorbed and from which the pyridine has then been desorbed by (ii) a weight of the metal salt.

The nonaqueous electrolyte secondary battery insulating porous layer of an embodiment of the present invention may preferably be arranged such that the fine particle contains titanium oxide, more preferably be arranged such that the fine particle contains elemental aluminum and elemental titanium. The nonaqueous electrolyte secondary battery insulating porous layer may preferably be arranged such that the metal salt is at least partially in a form of a solid solution. The nonaqueous electrolyte secondary battery insulating porous layer may preferably be arranged such that the fine particle is a ground product. In addition, the nonaqueous electrolyte secondary battery insulating porous layer may preferably be arranged such that the fine particle contains a mixture of two or more kinds of metal salts.

A nonaqueous electrolyte secondary battery laminated separator of an embodiment of the present invention is a laminated separator for a nonaqueous electrolyte secondary battery, the laminated separator including: a porous film containing a polyolefin as a main component; and an insulating porous layer disposed on one or both surfaces of the porous film, the insulating porous layer containing a fine particle of a metal salt, the metal salt having a Lewis acid peak area within a range of not less than 0.2 $g^{-1}$ and not more than 3.6 $g^{-1}$ per unit weight, the Lewis acid peak area being measured by an infrared spectroscopy-based acid nature evaluation method for a solid surface, a Lewis acid peak area of a metal salt per unit weight being defined as a value resulting from dividing (i) an area of a peak present in a region of 1447 $cm^{-1}$ to 1460 $cm^{-1}$ of an infrared (IR) absorption spectrum measured of a sample on which pyridine was adsorbed and from which the pyridine has then been desorbed by (ii) a weight of the metal salt.

The nonaqueous electrolyte secondary battery laminated separator of an embodiment of the present invention may preferably be arranged such that the fine particle contains titanium oxide, more preferably be arranged such that the fine particle contains elemental aluminum and elemental titanium. The nonaqueous electrolyte secondary battery laminated separator may preferably be arranged such that the metal salt is at least partially in a form of a solid solution. The nonaqueous electrolyte secondary battery laminated separator may preferably be arranged such that the fine particle is a ground product. In addition, the nonaqueous electrolyte secondary battery laminated separator may preferably be arranged such that the fine particle contains a mixture of two or more kinds of metal salts.

A nonaqueous electrolyte secondary battery member of an embodiment of the present invention may be a nonaqueous electrolyte secondary battery member, including: a cathode; an insulating porous layer of an embodiment of the present invention; and an anode, the cathode, the insulating porous layer, and the anode being arranged in that order. A nonaqueous electrolyte secondary battery member of an embodiment of the present invention may be a nonaqueous electrolyte secondary battery member, including: a cathode; a laminated separator of an embodiment of the present invention; and an anode, the cathode, the laminated separator, and the anode being arranged in that order.

A nonaqueous electrolyte secondary battery of an embodiment of the present invention is a nonaqueous electrolyte secondary battery, including an insulating porous layer of an embodiment of the present invention or a laminated separator of an embodiment of the present invention.

Advantageous Effects of Invention

A nonaqueous electrolyte secondary battery separator or nonaqueous electrolyte secondary battery laminated separator of an embodiment of the present invention allows a nonaqueous electrolyte secondary battery including the nonaqueous electrolyte secondary battery separator or nonaqueous electrolyte secondary battery laminated separator integrated therein to have an improved discharge output characteristic. Similarly, a nonaqueous electrolyte secondary battery member allows a nonaqueous electrolyte secondary battery including the nonaqueous electrolyte secondary battery member integrated therein to have an improved discharge output characteristic. A nonaqueous electrolyte secondary battery of an embodiment of the present invention has a discharge output characteristic superior to those of conventional nonaqueous electrolyte secondary batteries.

BRIEF DESCRIPTION OF DRAWINGS

FIG. 1 is a diagram illustrating a flow of a method for measurement of a Lewis acid peak area which method was used in Examples and Comparative Examples.

DESCRIPTION OF EMBODIMENTS

The following description will discuss an embodiment of the present invention in detail. The expression "A to B" in the description below means "not less than A and not more than B".

[Embodiment 1: Nonaqueous Electrolyte Secondary Battery Insulating Porous Layer and Embodiment 2: Nonaqueous Electrolyte Secondary Battery Laminated Separator]

Embodiment 1 of the present invention is a nonaqueous electrolyte secondary battery insulating porous layer containing fine particles of a metal salt, the metal salt having a Lewis acid peak area within a range of not less than 0.2 $g^{-1}$ and not more than 3.6 $g^{-1}$ per unit weight, the Lewis acid peak area being measured by an infrared spectroscopy-based acid nature evaluation method for a solid surface.

Embodiment 2 of the present invention is a nonaqueous electrolyte secondary battery laminated separator including: a porous film containing a polyolefin as a main component; and an insulating porous layer disposed on one or both surfaces of the porous film, the insulating porous layer containing fine particles of a metal salt, the metal salt having a Lewis acid peak area within a range of not less than 0.2 $g^{-1}$ and not more than 3.6 $g^{-1}$ per unit weight, the Lewis acid peak area being measured by an infrared spectroscopy-based acid nature evaluation method for a solid surface.

The following description will discuss individual members of a nonaqueous electrolyte secondary battery insulating porous layer and nonaqueous electrolyte secondary battery laminated separator of an embodiment of the present invention in detail.

[Insulating Porous Layer]

The nonaqueous electrolyte secondary battery insulating porous layer (insulating porous layer) of an embodiment of the present invention can, for example, be used alone as a nonaqueous electrolyte secondary battery separator in the form of an electrode coating layer or be disposed on a porous film described later for use as a member of a nonaqueous electrolyte secondary battery laminated separator.

The nonaqueous electrolyte secondary battery insulating porous layer and nonaqueous electrolyte secondary battery laminated separator of an embodiment of the present invention are each configured such that the insulating porous layer contains fine metal salt particles having, per unit weight, a Lewis acid peak area within a range of not less than 0.2 $g^{-1}$ and not more than 3.6 $g^{-1}$, preferably within a range of not less than 0.25 $g^{-1}$ and not more than 3.55 $g^{-1}$, more preferably within a range of not less than 0.3 $g^{-1}$ and not more than 3.5 $g^{-1}$.

The Lewis acid peak area of a metal salt per unit weight in the present specification is calculated by dividing (i) the area of a peak present in a region of 1447 cm$^{-1}$ to 1460 cm$^{-1}$ of an infrared (IR) absorption spectrum measured of a sample on which pyridine was adsorbed and from which the pyridine has then been desorbed by (ii) the weight of a metal salt used for the measurement.

Specifically, the Lewis acid peak area of a metal salt per unit weight is calculated by the following method:

First, 40 mg of fine metal salt particles as a filler raw material is weighed out, and is shaped into a disc-shaped pellet. The pellet is placed in a heating transmissive type in-situ cell at room temperature, and the cell is vacuumed. Then, the temperature inside the cell is raised to 500° C., and is then maintained for 60 minutes. Then, the cell is cooled down to 30° C. A measurement is then made of an infrared transmission spectrum with use of Avatar 360, a Fourier transform infrared spectrophotometer produced by Nicolet Corporation, under the conditions that the resolution is 4 cm$^{-1}$, the number of integrations is 256, and the wave number in the measurement region is within a range of 4000 cm$^{-1}$ to 400 cm$^{-1}$. The spectrum measured is used as a background spectrum.

Subsequently, the temperature inside the cell is raised to 100° C. Pyridine vapor is then introduced into the cell, and the pellet is let adsorb pyridine for 5 minutes. Then, the temperature inside the cell is raised to 150° C., and is then maintained for 60 minutes so that the physically adsorbed pyridine is desorbed from the pellet made of the fine metal salt particles. Then, the temperature inside the cell is lowered to 30° C. A measurement is then made of an infrared transmission spectrum of a sample on which pyridine was adsorbed and from which the pyridine has then been desorbed under conditions identical to the above conditions for measurement of an infrared transmission spectrum.

Then, on the basis of the two infrared transmission spectrums measured, a calculation is made of the area of a peak derived from Lewis acid and present in the region of 1447 cm$^{-1}$ to 1460 cm$^{-1}$. Specifically, the infrared transmission spectrum in the background is removed from the infrared transmission spectrum after the pyridine adsorption and pyridine desorption to calculate an infrared absorption spectrum, and then a baseline is drawn that passes through the opposite ends of the peak (which is present in the region of 1447 cm$^{-1}$ to 1460 cm$^{-1}$) so that the area of the portion surrounded by the baseline and the peak is used as the peak area. The peak area is divided by the weight (40 mg) of the metal salt to calculate the peak area of the metal salt per unit weight.

The Lewis acid peak area per unit weight of fine metal salt particles in the insulating porous layer indicates the Lewis acidity of those fine metal salt particles per unit weight. A high Lewis acidity of the fine metal salt particles per unit weight leads to high affinity between (i) the fine metal salt particles and (ii) the electrolyte solution solvent of a nonaqueous electrolyte secondary battery including the insulating porous layer as a separator or as a member of a laminated separator.

A nonaqueous electrolyte secondary battery functions such that cations (for example, Li$^+$ in the case of a lithium ion secondary battery) solvated with the electrolyte solution solvent pass through the separator (namely, a nonaqueous electrolyte secondary battery insulating porous layer or an insulating porous layer as a member of a nonaqueous electrolyte secondary battery laminated separator), are desolvated, and are then inserted into the cathode. Since the desolvation process is a factor in the internal resistance of the nonaqueous electrolyte secondary battery, accelerating the desolvation can reduce the internal resistance of the nonaqueous electrolyte secondary battery and improve the output characteristic of the battery.

The likelihood of the above desolvation is influenced by the affinity between the electrolyte solution solvent and components of the insulating porous layer, in particular, fine metal salt particles contained in those components. Thus, adjusting the Lewis acidity per unit weight of fine metal salt particles in the insulating porous layer within a moderate range can improve the output characteristic of a nonaqueous electrolyte secondary battery to be produced.

Specifically, if a nonaqueous electrolyte secondary battery insulating porous layer contains fine metal salt particles having a Lewis acid peak area of less than 0.2 g$^{-1}$ per unit weight, the filler will have an excessively low Lewis acidity and be unable to interact with solvent molecules (Lewis base) solvated with the cations (for example, Li$^+$), with the result of the above desolvation having an unincreased rate. This means that a nonaqueous electrolyte secondary battery including the insulating porous layer integrated therein as a separator or as a member of a laminated separator will not have an improved output characteristic. If an insulating porous layer contains fine metal salt particles having a Lewis acid peak area of more than 3.6 g$^{-1}$ per unit weight, the filler will have an excessively high Lewis acidity. This high Lewis acidity will in turn activate solvent molecules (Lewis base), thereby making likely (i) a reaction that generates cracked gas of solvent molecules and (ii) a side reaction, such as polymerization of solvent molecules, that generates a byproduct which leads to degradation in a battery output characteristic. This means that a nonaqueous electrolyte secondary battery including the insulating porous layer integrated therein as a separator or as a member of a laminated separator will have a contrarily degraded output characteristic.

The Lewis acid peak area (Lewis acidity) of fine metal salt particles per unit, weight can be adjusted by adjusting the composition and/or surface area (specifically, shape and particle size) of the fine metal salt particles. The surface area of the fine metal salt particles can be adjusted on the basis of conditions under which the fine metal salt particles are prepared (grinding conditions in a case where the fine metal salt particles are a ground product).

The fine metal salt particles contained in the insulating porous layer are made of a metal salt. The insulating porous layer may contain (i) only one kind of fine metal salt particles or (ii) a combination of two or more kinds of fine metal salt particles which kinds differ from each other in terms of the particle diameter and specific surface area.

The fine metal salt particles each have a shape that varies depending on, for example, (i) the method for producing the metal salt as a raw material and (ii) the condition under which the fine metal salt particles are dispersed when a coating solution (described later) for forming a porous layer is prepared. The fine metal salt particles may each have any of various shapes such as a spherical shape, an oblong shape, a rectangular shape, a gourd shape, or an indefinite, irregular shape.

The fine metal salt particles have a volume-based particle size distribution having two peak tops, namely a first peak top and a second peak top. The fine metal salt particles are preferably arranged such that (i) the first peak top corresponds to a particle size of not less than 0.4 μm and not more than 0.6 μm and that (ii) the second peak top corresponds to a particle size of not less than 5 μm and not more than 7 μm. The fine metal salt particles are more desirably arranged such that in addition, the first peak top has a cumulative distribution (minus sieve) of not less than 10% and not more than 20% and that the second peak top has a cumulative distribution (minus sieve) of not less than 60% and not more than 80%.

The fine metal salt particles are preferably a ground product, more preferably a ground product having an average particle diameter and particle size distribution each within the above range. The fine metal salt particles can be prepared as a ground product by wet grinding or dry grinding. Specific examples of the method for preparing the ground product include, but are not limited to, a method of grinding a coarse filler in, for example, a high-speed rotation mill, a tumbling mill, a vibrating mill, a planetary mill, a medium stirring mill, or an airflow crusher. The method is, among the above examples, preferably dry grinding that involves no disperse medium, more preferably dry grinding that further involves a device which uses a grinding medium such as a bead mill or a vibratory ball mill, particularly preferably the grinding medium additionally having a Mohs' hardness not lower than the Mohs' hardness of the metal salt. A specific example of the grinding method is a media-less grinding method, which does not cause a collision between ceramic particles and a medium, as disclosed in, for example, U.S. Pat. No. 4,781,263, which describes a method that combines a jet stream and high-speed shearing that uses a rotary blade.

The fine metal salt particles are made of any metal salt, and are made of preferably inorganic matter, more preferably metal carbonate and metal oxide. Specific examples include an alkali metal carbonate such as lithium carbonate and sodium carbonate; an alkali earth metal carbonate such as calcium carbonate and barium carbonate; magnesium, carbonate; and a metal oxide such as titanium oxide, alumina, boehmite (alumina monohydrate), xircoma, silica, magnesia, calcium oxide, barium oxide, boron oxide, and zinc oxide. Further, the metal oxide may be a complex oxide. The complex oxide preferably contains as a constituent metallic element at least one element selected from elemental aluminum, elemental titanium, a zirconium element, a silicon element, a boron element, a magnesium element, a calcium element, and a barium element, further preferably elemental aluminum and elemental titanium. The metal salt preferably contains alumina, titanium oxide, lithium carbonate, calcium carbonate, and/or magnesium carbonate, particularly preferably alumina and titanium oxide.

The metal salt may be made of only one kind of metal oxide, but are preferably made of two or more kinds of metal oxides. The metal salt, in particular, preferably contains titanium oxide, more preferably contains elemental aluminum and elemental titanium. The fine metal salt particles may be made of a mixture of two or more kinds of metal salts. The fine metal salt particles preferably contain a metal salt(s) in the form of a solid solution, more preferably contain only a metal salt(s) in the form of a solid solution. Specifically, the fine metal salt particles are particularly preferably made of a solid solution of alumina and titania.

The insulating porous layer of an embodiment of the present invention is normally a resin layer containing not only a filler made of a metal salt but also a resin as a binder. The insulating porous layer contains a resin that is preferably (i) insoluble in the electrolyte solution of the battery and (ii) electrochemically stable when the battery is in normal use.

Specific examples of the resin include polyolefins such as polyethylene, polypropylene, polybutene, and ethylene-propylene copolymer; fluorine-containing resins such as a vinylidene fluoride homopolymer (polyvinylidene fluoride), a vinylidene fluoride copolymer (for example, a vinylidene fluoride-hexafluoro propylene copolymer and a vinylidene fluoride-hexafluoro propylene-tetrafluoroethylene copolymer), and a tetrafluoroethylene copolymer (for example, an ethylene-tetrafluoroethylene copolymer); fluorine-containing rubbers having a glass transition temperature of not higher than 23° C. among the above fluorine-containing resins; aromatic polyamides; fully aromatic polyamides (aramid resins); rubbers such as styrene-butadiene copolymer and a hydride thereof, methacrylic acid ester copolymer, acrylonitrile-acrylic acid ester copolymer, styrene-acrylic acid ester copolymer, ethylene propylene rubber, and polyvinyl acetate; resins with a melting point or glass transition temperature of not lower than 180° C. such as polyphenylene ether, polysulfone, polyether sulfone, polyphenylene sulfide, polyetherimide, polyamide imide, polyesterimide, and polyester; and water-soluble polymers such as polyvinyl alcohol, polyethyleneglycol, cellulose ether, sodium alginate, polyacrylic acid, polyacrylamide, and polymethacrylic acid.

The resin contained in the porous layer in accordance with an embodiment of the present invention may suitably be a water-insoluble polymer as well. Stated differently, the porous layer in accordance with an embodiment of the present invention may also preferably be produced, with use of an emulsion or dispersion containing a water-insoluble polymer (for example, an acrylate resin) dispersed in an aqueous solvent. This allows the porous layer in accordance with an embodiment of the present invention to contain the water-insoluble polymer as the resin.

The water-insoluble polymer is not dissolved in the aqueous solvent, but dispersed in the aqueous solvent in the form of particles. A water-insoluble polymer is defined as follows: In a case where 0.5 g of the polymer is dissolved in 100 g of water at 25° C. the insoluble component is not less than 90 weight %. A water-soluble polymer is, on the other hand, defined as follows: In a case where 0.5 g of the polymer is dissolved in 100 g of water at 25° C., the insoluble component is less than 0.5 weight %. The particles of the water-insoluble polymer are not limited to any particular shape, but desirably have a spherical shape.

A water-insoluble polymer is produced by, for example, polymerizing in an aqueous solvent a monomer composition containing a monomer described below to produce a polymer in the form of particles.

Examples of a monomer for the water-insoluble polymer include styrene, vinyl ketone, acrylonitrile, methyl methacrylic, ethyl methacrylate, glycidyl methacrylate, glycidyl acrylate, methylacrylate, acrylic acid ethyl, and acrylic acid butyl.

The polymer in the form of particles may be not only a homopolymer of a monomer, but also a copolymer of two or more monomers. Examples of the polymer include fluorine-containing resins such as polyvinylidene fluoride, a vinylidene fluoride copolymer (for example, a vinylidene fluoride-hexafluoro propylene copolymer and a vinylidene fluoride-hexafluoro propylene-tetrafluoroethylene copolymer), and a tetrafluoroethylene copolymer (for example, an ethylene-tetrafluoroethylene copolymer); melamine resin; urea resin; polyethylene; polypropylene; polymethyl acrylate; polymethyl methacrylate; and polyacrylic acid butyl.

The aqueous solvent may be any aqueous solvent that contains water as a main component and that allows the water-insoluble polymer particles to be dispersed. The aqueous solvent may contain any amount of an organic solvent that can be mixed with water at any ratio. Examples of the organic solvent include methanol, ethanol, isopropyl alcohol, acetone, tetrahydrofuran, acetonitrile, and N-methylpyrrolidone. The aqueous solvent may further contain, for example, an additive such as (i) a surface active agent such as sodium dodecylbenzenesulfonate or (ii) a dispersing agent such as a sodium salt of polyacrylic acid or carboxymethyl cellulose. The aqueous solvent may contain only one kind of organic solvent or a mixture of two or more kinds of organic solvents. The aqueous solvent may contain only one kind of additive or a mixture of two or more kinds of additives. In a case where the aqueous solvent contains an organic solvent, the organic solvent is contained at a weight proportion of 0.1 weight % to 99 weight %, preferably 0.5 weight % to 80 weight %, further preferably 1 weight % to 50 weight %, with respect to water with the total of the weight of the organic solvent and the weight of the water being 100 weight %.

The porous layer in accordance with an embodiment of the present invention may contain one kind of resin or a mixture of two or more kinds of resins.

Specific examples of the aromatic, polyamides include poly(paraphenylene terephthalamide), poly(methaphenylene isophthalamide), poly(parabenzamide), poly(methabenzamide), poly(4,4'-benzanilide terephthalamide), poly(paraphenylene-4,4'-biphenylene dicarboxylic acid amide), poly(methaphenylene-4,4'-biphenylene dicarboxylic acid amide), poly(paraphenylene-2,6-naphthalene dicarboxylic acid amide), poly(methaphenylene-2,6-naphthialene dicarboxylic acid amide), poly(2-chloroparaphenylene terephtalamide), paraphenylene terephthalamide/2,6-dichlotoparaphenylene terephthalamide copolymer, and methaphenylene terephthaiamide/2,6-dichloroparaphenyene terephthalamide copolymer. Among these, poly(paraphenylene terephthalamide) is preferable.

The resin is more preferably polyolefin, a fluorine-containing resin, a fluorine-containing rubber, aromatic polyamide, water-soluble polymer, or a water-insoluble polymer in the form of particles dispersed in an aqueous solvent. The resin is particularly preferably a fluorine-containing resin because in a case where the insulating porous layer is used as a separator of a nonaqueous electrolyte solution secondary battery or a member of a nonaqueous electrolyte solution secondary battery laminated separator, the nonaqueous electrolyte secondary battery can easily maintain various performance capabilities such as the rate characteristic and resistance characteristic (solution resistance) even in a case where the battery is oxidatively degraded through its charging and discharging. The resin is more preferably a water-soluble polymer or a water-insoluble polymer in the form of particles dispersed in an aqueous solvent in terms of the process and environmental burden because in such a case, water can be used as a solvent for forming an insulating porous layer. The water-soluble polymer is further preferably cellulose ether or sodium, alginate, particularly preferably cellulose ether.

Specific examples of the cellulose ether include carboxymethyl cellulose (CMC), hydroxyethyl cellulose (HEC), carboxy ethyl cellulose, methyl cellulose, ethyl cellulose, cyan ethyl cellulose, and oxyethyl cellulose. The cellulose ether is more preferably CMC or HEC, each, of which does not significantly deteriorate even after an extended time period of use and is excellent in chemical stability. The cellulose ether is particularly preferably CMC.

The water-insoluble polymer in the form of particles dispersed in an aqueous solvent is preferably (i) a homopolymer of an acrylate monomer such, as methyl methacrylate, ethyl methacrylate, glycidyl methacrylate, glycidyl acrylate, methyl acrylate, acrylic acid ethyl, or acrylic acid butyl or (ii) a copolymer of two or more kinds of monomers from the viewpoint of adhesiveness between inorganic filler particles.

In the case where the insulating porous layer contains a resin in addition to a filler made of a metal salt, the filler is contained in an amount preferably within a range of 1% by volume to 99% by volume, more preferably within a range of 5% by volume to 95% by volume, with respect to the entire insulating porous layer. The fine particles being contained in an amount within the above range can reduce the possibility that a void formed by contact between the fine particles is blocked by, for example, the resin, and thus allows the insulating porous layer to have a sufficient ion permeability. The above arrangement also allows the insulating porous layer to have an appropriate weight per unit area.

The insulating porous layer has a weight per unit area (for each surface) selected as appropriate in view of the strength, thickness, weight, and handleability of the insulating porous layer. The weight per unit area, is, however, normally preferably within a range of 1 $g/m^2$ to 20 $g/m^2$, more preferably within a range of 2 $g/m^2$ to 10 $g/m^2$ in order to, in the case where the insulating porous layer is used as a member of a nonaqueous electrolyte secondary battery insulating porous layer as a separator or a nonaqueous electrolyte secondary battery laminated separator, increase the energy density per unit weight and energy density per unit volume of the battery. A weight per unit area of the insulating porous layer outside the above range will, in the case where the insulating porous layer is used as a member of a nonaqueous electrolyte secondary battery insulating porous layer as a separator or a nonaqueous electrolyte secondary battery laminated separator, result in a heavier nonaqueous electrolyte secondary battery including the insulating porous layer.

The insulating porous layer contains, per square meter, an insulating porous layer constituent component in a volume (for each surface) preferably within a range of 0.5 $cm^3$ to 20 $cm^3$, more preferably within a range of 1 $cm^3$ to 10 $cm^3$, further preferably within a range of 2 $cm^3$ to 7 $cm^3$. In other words, the insulating porous layer has a component volume per unit area (for each surface) preferably within a range of 0.5 $cm^3/m^2$ to 20 $cm^3/m^2$, more preferably within a range of 1 $cm^3/m^2$ to 10 $cm^3/m^2$, further preferably within a range of 2 $cm^3/m^2$ to 7 $cm^3/m^2$. A component volume per unit area of the insulating porous layer of less than 0.5 $cm^3/m^2$ will, in the case where the porous layer is used as a member of a nonaqueous electrolyte secondary battery separator or a nonaqueous electrolyte secondary battery laminated separator, result in a failure to sufficiently prevent an internal short circuit due to, for example, a breakage of the battery.

The component volume per unit area is calculated by the following method:

(1) The weight per unit area of the insulating porous layer is multiplied by the weight concentration of each component of the insulating porous layer (that, is, the weight concentration in the porous layer) to calculate the weight per unit area of each component.

(2) The weight per unit area of each component calculated in (1) is divided by the true specific gravity of that component. The sum of the resulting values is used as the component volume per unit area of a B layer (insulating porous layer).

A component volume per unit, area of the insulating porous layer of more than 20 $cm^3/m^2$ will result in an increase in the resistance in transmissivity of lithium ions over the entire region of the insulating porous layer. Thus, in a case where a nonaqueous electrolyte secondary battery including the insulating porous layer repeats a cycle, the cathode will deteriorate, with the result of degradation in the rate characteristic and/or cycle characteristic of the battery.

The insulating porous layer has a porosity preferably within a range of 20% by volume to 90% by volume, more preferably within a range of 30% by volume to 70% by volume, for a sufficient ion permeability. Further, the insulating porous layer has pores each having a pore size of preferably not more than 3 µm, more preferably not more than 1 µm, in order for the insulating porous layer to have a sufficient ion permeability and in order to prevent particles separated from the electrodes from passing through the insulating porous layer.

The insulating porous layer has a thickness of normally not less than 0.1 µm and not more than 20 µm, preferably not less than 2 µm and not more than 15 µm. An excessively large thickness (more than 20 µm) of the insulating porous layer will lead to an increase in the internal resistance of a nonaqueous electrolyte secondary battery including the insulating porous layer and thus to degradation in battery characteristics (for example, output characteristic) of the battery. An excessively small thickness (less than 0.1 µm) of the insulating porous layer will lead to a decrease in the insulation and voltage leak resistance of the insulating porous layer. Further, with the insulating porous layer having an excessively small thickness, in a case where the insulating porous layer is disposed on a polyolefin porous film for use as a nonaqueous electrolyte secondary battery laminated separator member, abnormal heat generation in a nonaqueous electrolyte secondary battery including that laminated separator may result in the laminated separator contracting as the laminated separator becomes unable to withstand thermal contraction of the polyolefin porous film. In a case where the insulating porous layer is disposed on both surfaces of the porous film (polyolefin porous film), the respective thicknesses of the two layers are combined to mean the "thickness of the insulating porous layer".

The insulating porous layer of an embodiment of the present invention may be produced by, for example, a method including (i) dissolving the resin in a solvent and dispersing the fine metal salt particles in the solution to prepare a coating solution for forming an insulating porous layer, (ii) applying the coating solution to a surface of a base material, and then (iii) removing the solvent to allow an insulating porous layer to be deposited. The base material may be, for example, a porous film to be included in a nonaqueous electrolyte secondary battery laminated separator described later or an electrode to be included in a nonaqueous electrolyte secondary battery, particularly the cathode.

The solvent (disperse medium) may be any solvent that does not adversely influence the porous film, the electrode, or the like as a base material, that allows the resin to be dissolved therein uniformly and stably, and that allows the fine metal salt particles to be dispersed therein uniformly and stably. Specific examples of the solvent (disperse medium) include water; lower alcohols such as methyl alcohol, ethyl alcohol, n-propyl alcohol, isopropyl alcohol, and t-butyl alcohol; acetone, toluene, xylene, hexane, N-methylpyrrolidone, N,N-dimethyiacetamide, and N,N-dimethylformamide. The production method may use only one kind of solvent (disperse medium) or two or more kinds of solvents in combination.

The coating solution may be prepared by any method that allows the coating solution to satisfy conditions such as the resin solid content (resin concentration) necessary for a desired insulating porous layer and the amount of the fine metal salt particles. Specific examples of the method for preparing the coating solution include mechanical stirring method, ultrasonic dispersion method, high-pressure dispersion method, and media dispersion method. Further, the filler may be dispersed in a solvent (disperse medium) with use of a conventionally publicly known disperser such as a three-one motor, a homogenizer, a media disperser, or a pressure disperser. Further, in a case where the fine metal salt particles are prepared by wet grinding, a liquid containing a dissolved or swollen resin or an emulsified liquid containing a resin may be fed into a wet grinding device during wet grinding for preparation of fine metal salt particles with a desired average particle diameter so that a coating solution is prepared simultaneously with the wet grinding for fine metal salt particles. In other words, wet grinding for fine metal salt particles and preparation of a coating solution may be carried out simultaneously in a single step. Further, the coating solution may contain, as a component(s) other than the resin or fine particles, an additive(s) such as a dispersing agent, a plasticizer, a surfactant, and a pH adjusting agent as long as an embodiment of the present invention can attain its objects. The coating solution may contain the additive(s) in any amount(s) as long as an embodiment of the present invention can attain its objects.

The coating solution may be applied to the base material by any method. For instance, in a case where an insulating porous layer is deposited on each of both surfaces of the base material, (i) a sequential deposition method may be used, which forms an insulating porous layer on one surface of the base material and then forms another insulating porous layer on the other surface, or (ii) a simultaneous deposition method may be used, which forms two insulating porous layers simultaneously on respective surfaces of the base material. The insulating porous layer may be formed by, for example, (i) a method of directly applying the coating solution to a surface of the base material and removing the solvent (disperse medium) from the coating solution, (ii) applying the coating solution to an appropriate support, removing the solvent (disperse medium) from the coating solution to form an insulating porous layer, pressure-bonding the insulating porous layer and the base material to each other, and peeling the support off, (iii) a method of applying the coating solution to a surface of an appropriate support, pressure-bonding the base material to the surface of the support, peeling the support off, and removing the solvent (disperse medium) from the coating solution, or (iv) a method of immersing the base material in the coating solution, for dip coating and removing the solvent (disperse medium) from the coating solution. The thickness of the insulating porous layer may be controlled by adjusting, for example, (i) the thickness of a coating film in a wet state after the coating, (ii) the weight ratio of the resin and the fine particle, and/or (iii) the solid content concentration of the coating solution (that is, the sum of the resin concentration and the fine particle concentration). The support is, for example, a resin film, a metal belt, or a drum.

The coating solution may be applied to the base material or support by any method that allows for, for example, a necessary weight per unit area and a necessary coating area. The coating solution may be applied by a conventionally publicly known method. Specific examples of the method include gravure coater method, small-diameter gravure coater method, reverse roll coater method, transfer roll coater method, kiss coater method, dip coater method, knife coater method, air doctor blade coater method, blade coater method, rod coater method, squeeze coater method, cast coater method, bar coater method, die coater method, screen printing method, and spray applying method.

The solvent (disperse medium) is removed typically by a drying method. Examples of the drying method include natural drying, air-blowing drying, heat drying, and drying under reduced pressure. The solvent may, however, be removed by any method that allows the solvent (disperse medium) to be removed sufficiently. The coating solution may be dried after replacing the solvent (disperse medium) contained in the coating solution with another solvent. The solvent (disperse medium) may be replaced with another solvent for removal by, for example, a method of (i) preparing another solvent (hereinafter referred to as "solvent X") that dissolves the solvent (disperse medium) contained in the coating solution and that does not dissolve the resin contained in the coating solution, (ii) immersing the base material or support, to which the coating solution has been applied and on which a coating film has been formed, into the solvent X to replace the solvent (disperse medium) in the coating film on the base material or support with the solvent X, and (iii) evaporating the solvent X. This method allows the solvent (disperse medium) to be removed efficiently from the coating solution. In a case where (i) the base material is a porous film containing a polyolefin as a main component and (ii) the coating film, formed on the base material (porous film) or support by applying the coating solution thereto, is heated to remove the solvent (disperse medium) or solvent X from the coating film, the coating film is desirably heated at a temperature that does not decrease the air permeability of the porous film, specifically within a range of 10° C. to 120° C., preferably within a range of 2° C. to 80° C., to prevent pores in the porous film from contracting to decrease the air permeability of the porous film. The drying method may involve use of a normal drying device.

[Porous Film]

The nonaqueous electrolyte secondary battery laminated separator of an embodiment of the present invention includes a porous film to serve as a base material of the nonaqueous electrolyte secondary battery laminated separator. The porous film contains a polyolefin as a main component and has inside itself a large number of pores connected to one another. The porous film allows a gas, a liquid, or the like to pass therethrough from one surface to the other.

A porous film containing a polyolefin as a main component means a porous film containing a polyolefin at a proportion of not less than 50% by volume, more preferably not less than 90% by volume, further preferably not less than 95% by volume, of the entire porous film. The polyolefin preferably contains a high molecular weight component having a weight-average molecular weight of $5 \times 10^5$ to $15 \times 10^6$. The polyolefin particularly preferably contains a high molecular weight component having a weight-average molecular weight of not less than 1,000,000 because such a high molecular weight component increases (i) the strength of the porous film and (ii) that of the laminated body including the porous film, that is, the nonaqueous electrolyte secondary battery laminated separator.

Specific examples of a thermoplastic resin as the polyolefin include homopolymers (for example, polyethylene, polypropylene, and polybutene) and copolymers (for example, ethylene-propylene copolymer) produced through (co)polymerization of a monomer such as ethylene, propylene, 1-butene, 4-methyl-1-pentene, or 1-hexene. Among the above examples, polyethylene is preferable because it is able to prevent (shutdown) the flow of an excessively large current at a lower temperature. Examples of the polyethylene include a low-density polyethylene, a high-density polyethylene, a linear polyethylene (ethylene-α-olefin copolymer), and an ultra high molecular weight polyethylene having a weight-average molecular weight of not less than 1,000,000. Among these examples, an ultra high molecular weight polyethylene having a weight-average molecular weight of not less than 1,000,000 is preferable.

The porous film has a thickness selected as appropriate in view of the thickness of the nonaqueous electrolyte secondary battery laminated separator. The thickness is, however, normally within a range of 4 μm to 50 μm, preferably within a range of 5 μm to 30 μm, in a case where (i) the porous film is used as a base material and (ii) the insulating porous layer is disposed on one or both surfaces of the porous film to produce a nonaqueous electrolyte secondary battery laminated separator. A thickness of the porous film of less than 4 μm will lead to an insufficient mechanical strength for the porous film, with the possible result of a breakage of the porous film or a nonaqueous electrolyte secondary battery laminated separator including the porous film during the battery assembly. Further, such a small thickness will also lead to a decrease in the amount of electrolyte solution retained by the porous film, with the result of degradation in long-term characteristics of a nonaqueous electrolyte secondary battery including the porous film. On the other hand, a thickness of the porous film of more than 50 μm will result in an increase in the resistance in transmissivity of lithium ions over the entire region of a nonaqueous electrolyte secondary battery laminated separator including the porous film. Thus, as a nonaqueous electrolyte secondary battery including the nonaqueous electrolyte secondary battery laminated separator repeats a cycle, the cathode will deteriorate, with the result of degradation in the rate characteristic and/or cycle characteristic. Further, such a large thickness will lead to an increase in the distance between the anode and the cathode, with the result, of a larger nonaqueous electrolyte secondary battery.

The porous film has pores each having a pore size of preferably not more than 3 μm, further preferably not more than 1 μm.

The porous film has a weight, per unit area selected as appropriate in view of the strength, thickness, weight, and handling easiness of the nonaqueous electrolyte secondary battery laminated separator. The weight per unit area is, however, normally preferably within a range of 4 g/m$^2$ to 20 g/m$^2$, more preferably within a range of 5 g/m$^3$ to 12 g/m$^2$, in order to increase the energy density per unit weight and energy density per unit volume of a non-aqueous electrolyte secondary battery including the nonaqueous electrolyte secondary battery laminated separator integrated therein.

The porous film has an air permeability preferably within a range of 30 sec/100 mL to 500 sec/100 mL, more preferably within a range of 50 sec/100 mL to 300 sec/100 mL, in terms of Gurley values. The porous film having such an air permeability allows the nonaqueous electrolyte secondary battery laminated separator to have a sufficient ion permeability.

The porous film has a porosity preferably within a range of 30% by volume to 60% by volume, more preferably within a range of 35% by volume to 55% by volume, in order to allow the nonaqueous electrolyte secondary battery laminated separator to (i) retain a larger amount of electrolyte solution and (ii) achieve a function of reliably preventing (shutdown) the flow of an excessively large current at a lower temperature.

The porous film will, if it has a porosity of less than 30% by volume, have an increased resistance. The porous film will, if it has a porosity of more than 60% by volume, a decreased mechanical strength.

The porous film has pores each having a pore size of preferably not more than 3 µm, more preferably not more than 1 µm, in order to (i) allow the nonaqueous electrolyte secondary battery laminated separator to have a sufficient ion permeability and (ii) prevent particles from entering the cathode, the anode, or the like.

The porous film may be produced through any method, and may be produced through, for example, a method of (i) adding a pore forming agent such as calcium carbonate to a resin such as a polyolefin to shape the polyolefin into a film and then removing the pore forming agent with use of an appropriate solvent.

Specifically, in a case of, for example, producing a porous film with use of (i) a polyolefin resin containing an ultra high molecular weight polyethylene and (ii) a low molecular weight polyolefin having a weight-average molecular weight of not more than 10,000, such a porous film is, in terms of production cost, preferably produced through the method including steps of:

(1) kneading (i) 100 parts by weight of the ultra high molecular weight polyethylene, (ii) 5 parts by weight to 200 parts by weight of the low molecular weight polyolefin having a weight-average molecular weight of not more than 10,000, and (iii) 100 parts by weight to 400 parts by weight of an inorganic filler made of calcium carbonate and the like to produce a polyolefin resin composition, (2) shaping the polyolefin resin composition into a sheet, then either (3) removing the inorganic filler from the sheet produced in the step (2), and (4) stretching the sheet, from which the inorganic filler has been removed in the step (3), to produce a porous film, or (3') stretching the sheet produced in the step (2), and (4') removing the inorganic filler from the sheet stretched in the step (3') to produce a porous film.

The porous film may alternatively be a commercially available product having the above physical properties.

The porous film is preferably subjected to a hydrophilization treatment before the formation of an insulating porous layer, that is, before the application of a coating solution described later. Performing a hydrophilization treatment on the porous film further improves the coating easiness of the coating solution and thus allows a more uniform insulating porous layer to be formed. This hydrophilization treatment is effective in a case where the solvent (disperse medium) contained in the coating solution has a high proportion of water. Specific examples of the hydrophilization treatment include publicly known treatments such as (i) a chemical treatment involving an acid, an alkali, or the like, (ii) a corona treatment, and (iii) a plasma treatment. Among these hydrophilization treatments, a corona treatment is preferable because it can not only hydrophilize the porous film within a relatively short time period, but also hydrophilize only a surface and its vicinity of the porous film to leave the inside of the porous film unchanged in quality.

[Method for Producing Nonaqueous Electrolyte Secondary Battery Laminated Separator]

A method for producing a nonaqueous electrolyte secondary battery laminated separator of an embodiment of the present invention may be, for example, a method that corresponds to the above-described method for producing an insulating porous layer and that uses the above porous film as a base material.

The nonaqueous electrolyte secondary battery laminated separator of an embodiment of the present invention has a thickness normally within a range of 5 µm to 80 µm, preferably within a range of 5 µm to 50 µm, particularly preferably within a range of 6 µm to 35 µm. A separator as a whole having a thickness of less than 5 µm will easily break. On the other hand, in a case where the nonaqueous electrolyte secondary battery laminated separator has a thickness of more than 80 µm, a nonaqueous electrolyte secondary battery including the separator will have an increased internal resistance and suffer from degradation in battery characteristics (for example, output characteristic). Further, in a case where the battery has a small internal capacity, the battery will need to have a reduced electrode amount, with the result of the battery having a small capacity.

[Embodiment 3: Nonaqueous Electrolyte Secondary Battery Member and Embodiment 4: Nonaqueous Electrolyte Secondary Battery]

Embodiment 3 of the present invention may be a nonaqueous electrolyte secondary battery member including a cathode, the insulating porous layer as Embodiment 1 of the present invention, and an anode, the cathode, the porous layer, and the anode being arranged in that order. Embodiment 3 of the present invention may alternatively be a nonaqueous electrolyte secondary battery member including a cathode, the nonaqueous electrolyte secondary battery laminated separator as Embodiment 2 of the present invention, and an anode, the cathode, the nonaqueous electrolyte secondary battery laminated separator, and the anode being arranged in that order.

A nonaqueous electrolyte secondary battery member of an embodiment of the present invention includes, as a separator or a separator member, an insulating porous layer containing fine metal salt particles having, per unit weight, a Lewis acid peak area (Lewis acidity) controlled within a particular range. The nonaqueous electrolyte secondary battery member thus allows a nonaqueous electrolyte secondary battery including the nonaqueous electrolyte secondary battery member integrated therein to have an improved output characteristic.

Embodiment 4 of the present invention is a nonaqueous electrolyte secondary battery including (i) the insulating porous layer as Embodiment 1 of the present invention or (ii) the nonaqueous electrolyte secondary battery laminated separator as Embodiment 2 of the present invention. The nonaqueous electrolyte secondary battery includes a cathode, an anode, and an electrolyte solution in addition to the insulating porous layer or the nonaqueous electrolyte secondary battery laminated separator.

A nonaqueous electrolyte secondary battery of an embodiment of the present invention includes, as a separator or a separator member, a porous layer containing fine metal salt particles having, per unit weight, a Lewis acid peak area (Lewis acidity) controlled within a particular range. The nonaqueous electrolyte secondary battery thus has an excellent output characteristic.

The following description will discuss the individual members by taking a lithium ion secondary battery as an example nonaqueous electrolyte secondary battery. The nonaqueous electrolyte secondary battery member and nonaqueous electrolyte secondary battery of an embodiment of the present invention each include the above-described nonaqueous electrolyte secondary battery insulating porous layer or nonaqueous electrolyte secondary battery laminated separator of an embodiment of the present invention. Constituent elements of the nonaqueous electrolyte secondary battery other than the nonaqueous electrolyte secondary battery insulating porous layer or nonaqueous electrolyte secondary battery laminated separator are not limited to those described below.

[Electrolyte Solution]

The nonaqueous electrolyte secondary battery of an embodiment of the present invention includes, for example, a nonaqueous electrolyte solution prepared by dissolving a lithium salt in an organic solvent as an electrolyte solution solvent. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. The present embodiment may use (i) only one kind of the above lithium salts or (ii) two or more kinds of the above lithium salts in combination. The present embodiment preferably uses, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

The electrolyte solution solvent is not limited to any particular one. Specific examples of the electrolyte solution solvent include carbonates such as ethylene carbonate (EC), propylene carbonate (PMC), dimethyl carbonate (DMC), diethyl carbonate (DEC), ethyl methyl carbonate (EMC), 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents each prepared by introducing a fluorine group into the organic solvent. The present embodiment may use (i) only one kind of the above electrolyte solution solvents or (ii) two or more kinds of the above electrolyte solution solvents in combination. Among the above electrolyte solution solvents, carbonates are preferable. A mixed solvent of a cyclic carbonate and an acyclic carbonate or a mixed solvent of a cyclic carbonate, and an ether is more preferable. The mixed solvent of a cyclic carbonate and an acyclic carbonate is preferably a mixed solvent of ethylene carbonate, dimethyl carbonate, and ethyl methyl carbonate because such a mixed solvent allows a wider operating temperature range, and is not easily decomposed even in a case where the present embodiment uses, as an anode active material, a graphite material such as natural graphite or artificial graphite.

[Cathode]

The cathode may normally be a cathode typically used in a nonaqueous electrolyte secondary battery. The cathode is, for example, a sheet-shaped cathode including (i) a cathode mix containing a cathode active material, an electrically conductive material, and a binding agent and (ii) a cathode current collector supporting the cathode mix thereon.

The cathode active material is, for example, a material capable of being doped and dedoped with lithium ions. Specific examples of such a material include a lithium complex oxide containing at least one transition metal such as V, Mn, Fe, Co, or Ni. Among such lithium complex oxides, (i) a lithium complex oxide having an α-$NaFeO_2$ structure such as lithium nickelate and lithium, cobaltate and (ii) a lithium complex oxide having a spinel structure such as lithium manganese spinel are preferable because such lithium complex oxides have a high average discharge potential. The lithium complex oxide containing the at least one transition metal may further contain any of various metallic elements, and is more preferably complex lithium nickelate.

Further, the complex lithium nickelate particularly preferably contains at least one metallic element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metallic element and the number of moles of Ni in the lithium nickelate. This is because such a complex lithium nickelate allows an excellent cycle characteristic in a case where it is used in a high-capacity battery. The active material particularly preferably contains Al or Mn, and contains Ni at a proportion of not less than 85%, further preferably not less than 90%. This is because a nonaqueous electrolyte secondary battery including a cathode containing such an active material has an excellent cycle characteristic in a case where the nonaqueous electrolyte secondary battery has a high capacity.

Examples of the electrically conductive material include carbonaceous materials such as natural graphite, artificial, graphite, cokes, carbon black, pyrolytic carbons, carbon fiber, and a fired product of an organic polymer compound. The present embodiment may use (i) only one kind of the above electrically conductive materials or (ii) two or more kinds of the above electrically conductive materials in combination, for example, a mixture of artificial graphite and carbon black.

Examples of the binding agent include thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, vinylidene fluoride-hexafluoro propylene copolymer, a vinylidene fluoride-hexafluoropropylene-tetrafluoroethylene copolymer, and a thermoplastic polyimide, polyethylene, and polypropylene, as well as acrylic resin and styrene-butadiene-rubber. The binding agent functions also as a thickening agent.

The cathode mix may be prepared by, for example, a method of applying pressure to the cathode active material, the electrically conductive material, and the binding agent on the cathode current collector or a method of using an appropriate organic solvent so that the cathode active material, the electrically conductive material, and the binding agent are in a paste form.

The cathode current collector is, for example, an electric conductor such as Al, Ni, and stainless steel, among which Al is preferable because Al is easily processed into a thin film and is inexpensive.

The sheet-shaped cathode may be produced, that is, the cathode mix may be supported by the cathode current collector, by, for example, a method of applying pressure to the cathode active material, the electrically conductive material, and the binding agent on the cathode current collector to form a cathode mix thereon or a method of (i) using an appropriate organic solvent so that the cathode active material, the electrically conductive material, and the binding agent are in a paste form to provide a cathode mix, (ii) applying the cathode mix to the cathode current collector, (iii) drying the applied cathode mix to prepare a sheet-shaped cathode mix, and (iv) applying pressure to the sheet-shaped cathode mix so that the sheet-shaped cathode mix is firmly fixed to the cathode current collector.

[Anode]

The anode may normally be an anode typically used in a nonaqueous electrolyte secondary battery. The anode is, for example, a sheet-shaped anode including (i) an anode mix containing an anode active material and (ii) an anode current collector supporting the anode mix thereon. The sheet-shaped anode preferably contains the above-described electrically conductive material and binding agent.

The anode active material is, for example, (i) a material capable of being doped and dedoped with lithium ions, (ii) a lithium metal, or (iii) a lithium alloy. Specific examples of the material include carbonaceous materials such as natural graphite, artificial graphite, cokes, carbon black, pyrolytic carbons, carbon fiber, and a fired product of an organic polymer compound; and chalcogen compounds such as an oxide and a sulfide that are doped and dedoped with lithium ions at an electric potential lower than that for the cathode. Among the above anode active materials, a carbonaceous material containing a graphite material such as natural graphite or artificial graphite as a main component is preferable because such a carbonaceous material has high electric potential flatness and low average discharge potential, and can thus be combined with a cathode to achieve high energy density.

The anode mix may be prepared by, for example, a method of applying pressure to the anode active material on the anode current collector or a method of using an appropriate organic solvent so that the anode active material is in a paste form.

The anode current collector is, for example, Cu, Ni, or stainless steel, among which Cu is preferable because Cu is not easily alloyed with lithium in the case of a lithium ion secondary battery and is easily processed into a thin film.

The sheet-shaped anode may be produced, that is, the anode mix may be supported by the anode current collector, by, for example, a method of applying pressure to the anode active material on the anode current collector to form an anode mix thereon or a method of (i) using an appropriate organic solvent so that the anode active material is in a paste form to provide an anode mix, (ii) applying the anode mix to the anode current collector, (iii) drying the applied anode mix to prepare a sheet-shaped anode mix, and (iv) applying pressure to the sheet-shaped anode mix so that the sheet-shaped anode mix is firmly fixed to the anode current collector. The paste preferably contains the above-described conductive auxiliary agent and binding agent.

[Methods for Producing Nonaqueous Electrolyte Secondary Battery Member and Nonaqueous Electrolyte Secondary Battery]

A method for producing the nonaqueous electrolyte secondary battery member of an embodiment of the present invention is, for example, a method of arranging (i) the cathode, (ii) the nonaqueous electrolyte secondary battery insulating porous layer or nonaqueous electrolyte secondary battery laminated separator of an embodiment of the present invention, and (iii) an anode in that order to produce a nonaqueous electrolyte secondary battery member.

The nonaqueous electrolyte secondary battery of an embodiment of the present invention may be produced by, for example, the following method: The nonaqueous electrolyte secondary battery in accordance with an embodiment of the present invention may be produced by (i) arranging the cathode, the nonaqueous electrolyte secondary battery insulating porous layer or nonaqueous electrolyte secondary battery laminated separator, and the anode in that order to form a nonaqueous electrolyte secondary battery member, (ii) inserting the nonaqueous electrolyte secondary battery member into a container for use as a housing of the nonaqueous electrolyte secondary battery, (iii) filling the container with a nonaqueous electrolyte solution, and (iv) hermetically sealing the container under reduced pressure. The nonaqueous electrolyte secondary battery may have any shape such as the shape of a thin plate (sheet), a disk, a cylinder, or a prism such as a cuboid. The nonaqueous electrolyte secondary battery member and nonaqueous electrolyte secondary battery of an embodiment of the present invention may each be produced by any method, and may be produced by a conventionally publicly known method.

The present invention is not limited to the description of the embodiments above, but may be altered in various ways by a skilled person within the scope of the claims. Any embodiment based on a proper combination of technical means disclosed in different

EXAMPLES

The following description will discuss an embodiment of the present invention in greater detail on the basis of Examples and Comparative Examples. The present invention is, however, not limited by these Examples.

[Measurement Methods]

The methods below were used to measure, for example, physical properties of a nonaqueous electrolyte secondary battery laminated separator (laminated porous film), an A layer (porous film), and a B layer (insulating porous layer) each produced in each of the Examples and Comparative Examples and to also measure the discharge output characteristic (rate characteristic) of a nonaqueous electrolyte secondary battery produced in each of the Examples and Comparative Examples.

(1) Film Thickness (Unit: μm)

The thickness of the laminated porous film (that is, the total film thickness), the thickness of the A layer, and the thickness of the B layer were measured with use of VL-50, a high-precision digital measuring machine produced by Mitutoyo Corporation.

(2) Weight per Unit Area (Unit: $g/m^2$):

A square having each side with a length of 8 cm was cut out from the laminated porous film as a sample, and the weight W (g) of the sample was measured. Then, the weight per unit area of the laminated porous film (that is, the total weight per unit area) was calculated on the basis of the following formula:

$$\text{Weight per unit area } (g/m^2) = W/(0.08 \times 0.08)$$

The weight per unit area of the A layer was calculated similarly. The weight per unit area of the B layer wets calculated by subtracting the weight, per unit area of the A layer from the total weight per unit area.

(3) Average Particle Diameter and Particle Size Distributions (D10, D50, and D90 8 Volume-Based]) (Unit: μm):

The particle diameter and particle size distributions of the filler were measured with use of MICROTRAC (MODEL: MT-3300EXII), produced by Nikkiso Co., Ltd.

(4) Quantitative Determination of Lewis Acidity of Fine Metal Salt Particles

The Lewis acid peak area (Lewis acidity) per unit weight of fine metal salt particles produced in each of the Examples and Comparative Examples was measured in accordance with the flow illustrated in FIG. 1.

First, 40 mg of fine metal salt particles was weighed out, and was shaped into a disc-shaped pellet. The pellet was placed in a heating transmissive type in-situ cell at room temperature, and the cell was vacuumed. Then, the temperature inside the cell was raised to 500° C., and was then maintained for 60 minutes. Then, the cell was cooled down to 30° C. A measurement was then made of an infrared transmission spectrum with use of Avatar 360, a Fourier transform infrared spectrophotometer produced by Nicolet Corporation, under the conditions that the resolution was 4 cm$^{-1}$, the number of integrations was 256, and the wave number in the measurement region was within a range of 4000 cm$^{-1}$ to 400 cm$^{-1}$ (measurement 1). The spectrum measured was used as a background spectrum.

Subsequently, the temperature inside the cell was raised to 100° C. Pyridine vapor was then introduced into the cell, and the pellet was let adsorb pyridine for 5 minutes. Then, the temperature inside the cell was raised to 150° C. and was then maintained for 60 minutes so that the physically adsorbed pyridine was desorbed from the pellet made of the fine metal salt particles. Then, the temperature inside the cell was lowered to 30° C. A measurement was then made of an infrared transmission spectrum of a sample on which pyridine had been adsorbed and from which pyridine had then been desorbed under conditions identical to the above conditions for measurement of an infrared transmission spectrum (measurement 2).

Then, on the basis of the two infrared transmission spectrums measured, a calculation was made of the area of a peak (that is, the area of an absorbance peak) derived from Lewis acid and present in the region of 1447 cm$^{-1}$ to 1460 cm$^{-1}$. Specifically, the infrared transmission spectrum in the background was removed from the infrared transmission spectrum after the pyridine adsorption and pyridine desorption to calculate an infrared absorption spectrum, and then a baseline was drawn that passed through the opposite ends of the peak (which, was present in the region of 1447 cm$^{-1}$ to 1460 cm$^{-1}$) so that the area of the portion surrounded by the baseline and the peak was used as the peak area (that is, the area of an absorbance peak). The peak area (that is, the area of an absorbance peak) was divided by the weight (40 mg) of the metal salt to calculate the peak area (unit: g$^{-1}$) of the metal salt per unit weight.

(6) Rate Characteristic (%)

A nonaqueous electrolyte secondary battery prepared in each of the Examples and Comparative Examples was subjected to four cycles of initial charge/discharge. Each, cycle of the initial charge/discharge was performed under conditions that the temperature was 25° C., the voltage range was 4.1 V to 2.7 V, and the current value was 0.2 C (where 1 C is defined as the value of a current at which a rated capacity based on a discharge capacity at 1 hour rate is discharged for 1 hour. The same applies hereinafter).

After the initial charge/discharge, the nonaqueous electrolyte secondary battery was subjected to (i) three cycles of charging/discharging at 55° C. with use of a constant current having a charge current value of 1 C and a discharge current value of 0.2 C and to (ii) three more cycles of charging/discharging at 55° C. with use of a constant current having a charge current value of 1 C and a discharge current value of 20 C. The discharge capacity was measured for each of the two cases.

The measurement value of the discharge capacity was of the last one of the three cycles for each of the discharge current values of 0.2 C and 20 C. The ratio of the measurement values (discharge capacity for 20 C/discharge capacity for 0.2 C) was used as a rate characteristic (%).

Example 1

<A Layer>

A porous film as a base material was prepared from polyethylene (polyolefin).

Specifically, 70 parts by weight of an ultra-high-molecular-weight polyethylene powder (340M [produced by Mitsui Chemicals, Inc.]) and 30 parts by weight of a polyethylene wax having a weight-average molecular weight of 1000 (FMP-0115 [produced by Nippon Seiro Co., Ltd.]) were mixed with each other to prepare mixed polyethylene. To 100 parts by weight of the mixed polyethylene prepared, 0.4 parts by weight of an antioxidant (Irg1010 [produced by CIBA Specialty Chemicals Inc.]), 0.1 parts by weight of another antioxidant (P168 [produced by CIBA Specialty Chemicals Inc.]), and 1.3 parts by weight of sodium stearate were added, and calcium carbonate having an average particle diameter of 0.1 μm (produced by Maruo Calcium Co., Ltd.) was further added to have a proportion of 38% by volume with respect to the total volume. This composition was mixed in a Henschel mixer in the form of powder, and was then melted and kneaded in a twin screw kneading extruder to provide a polyethylene resin composition. Next, this polyethylene resin composition was rolled with use of a pair of rolls each having a surface temperature set at 150° C. This prepared a sheet. This sheet was immersed in an aqueous hydrochloric acid solution (which contained 4 mol/L of hydrochloric acid and 0.5 weight % of a nonionic surfactant) so that the calcium carbonate was dissolved for removal. Subsequently, the sheet was drawn at 105° C. to have an area 6 times the original area. This prepared a porous film made of polyethylene (A layer).

<Preparation of B Layer>

(Preparation of Fine Metal Salt Particles)

Aluminiumoxid/Titandioxid ($Al_2O_3:TiO_2=60:40$, solid solution) produced by ceram GmbH was used as a metal salt. This metal salt was ground for 4 hours in a vibrating mill provided with an alumina pot having a capacity of 3.3 L and an alumina ball having a φ of 15 mm. This produced fine metal salt particles.

(Preparation of Coating Solution)

The fine metal salt particles, a vinylidene fluoride-hexafluoro propylene copolymer (KYNAR2801 [product name, produced by Arkema Inc.) as a binder resin, and N-methyl-2-pyrrolidinone (produced by Kanto Chemical Co., Inc.) as a solvent were mixed with one another as follows:

First, 10 parts by weight of the vinylidene fluoride-hexafluoro propylene copolymer was added to 90 parts by weight of the fine metal salt particles to prepare a mixture. The solvent was added to this mixture so that the solid content (that is, the fine metal salt particles and the vinylidene fluoride-hexafluoro propylene copolymer) had a concentration of 40 weight %. This produced a mixed solution. This mixed solution was stirred and mixed in a FILMIX (registered trademark), a thin-film rotary high-speed mixer produced by PRIMIX Corporation. This produced a uniform coating solution 1.

<Preparation of Nonaqueous Electrolyte Secondary Battery Laminated Separator (Laminated Porous Film)>

The coating solution 1 produced as above was applied to a surface of the A layer by doctor blade method. The resulting coating film was dried at 85° C. with use of an air blowing dryer (model: WFO-601SD, produced by Tokyo Rikakikai Co., Ltd.). This formed a B layer. These operations produced a laminated porous film 1 including (i) an A layer and (ii) a B layer disposed on a surface of the A layer.

<Measurement of Physical Properties of Nonaqueous Electrolyte Secondary Battery Laminated Separator, Porous Film, and Insulating Porous Layer>

The above measurement methods were used to measure, for example, the Lewis acid peak area of the fine metal salt particles per unit weight, physical properties of (i) the laminated porous film 1 produced as above, (ii) the porous film (A layer), included in the laminated porous film 1, and (iii) the insulating porous layer (B layer), included in the laminated porous film 1. Table 1 shows the value measured of the Lewis acid peak area of the fine metal salt particles per unit weight.

<Preparation of Nonaqueous Electrolyte Secondary Battery>

A nonaqueous electrolyte secondary battery was prepared from a cathode below, an anode below, and the laminated porous film 1 by an assembly method below.

(Cathode)

A commercially available cathode was used that was produced by applying, to an aluminum foil, a mixture of $LiNi_{0.5}Mn_{0.3}Ca_{0.2}O_2$, an electrically conductive material, and PVDF (with a weight ratio of 92:5:3). The aluminum foil for the cathode was cut so that (i) a portion of the cathode in which portion a cathode active material layer was present had a size of 45 mm×30 mm and (ii) a portion of the cathode in which portion a cathode active material layer was absent and which had a width of 13 mm remained around the above portion. The cathode active material layer had a thickness of 58 μm, a density of 2.50 g/cm$^3$, and a cathode capacity of 174 mAh/g.

(Anode)

A commercially available anode was used that was produced by applying, to a copper foil, a mixture of graphite, a styrene-1,3-butadiene copolymer, and carboxymethyl cellulose sodium (with a weight ratio of 98:1:1). The copper foil for the anode was eat so that (i) a portion of the anode in which portion an anode active material layer was present had a size of 50 mm×35 mm and (ii) a portion of the anode in which portion an anode active material layer was absent and which had a width of 13 mm remained around the above portion. The anode active material layer had a thickness of 49 μm, a density of 1.40 g/cm$^3$, and an anode capacity of 372 mAh/g.

(Assembly Method)

In a laminate pouch, the cathode, the laminated porous film 1, and the anode were laminated (disposed) in this order to produce a nonaqueous electrolyte secondary battery member 1. In this case, the cathode and the anode were positioned so that the whole of a main surface of the cathode active material layer of the cathode was included in a range of a main surface (that is, overlapped the main surface) of the anode active material layer of the anode.

Subsequently, the nonaqueous electrolyte secondary battery member 1 was put in a bag made by laminating an aluminum layer and a heat seal layer, and 0.25 mL of a nonaqueous electrolyte solution was poured into the bag. The nonaqueous electrolyte solution was an electrolyte solution having a temperature of 25° C. which electrolyte solution was prepared by dissolving $LiPF_6$ having a concentration of 1.0 mol/liter in a mixed solvent containing (i) ethyl methyl carbonate, (ii) diethyl carbonate, and (iii) ethylene carbonate at a volume ratio of 50:20:30. The bag was heat-sealed while the pressure inside the bag was reduced, so that a nonaqueous secondary battery 1 was produced. The nonaqueous secondary battery 1 had a design capacity of 20.5 mAh.

<Measurement of Physical Properties of Nonaqueous Electrolyte Secondary Battery>

The rate characteristic (%) of the nonaqueous electrolyte secondary battery 1 produced was measured by the above method for rate characteristic measurement. Table 1 shows the results.

Example 2

Operations similar to those of Example 1 were carried out except that Aluminiumoxid/Titandioxid ($Al_2O_3$:$TiO_2$=60:40, solid solution) produced by ceram GmbH was replaced as a metal salt with Aluminiumoxid/Titandioxid ($Al_2O_3$:$TiO_2$=85:15, solid solution). The operations produced a laminated porous film 2, a nonaqueous electrolyte secondary battery member 2, and a nonaqueous secondary battery 2. Further, methods similar to those used in Example 1 were used to measure physical properties of the three products. Table 1 shows the results.

Example 3

Operations similar to those of Example 1 were carried out except that Aluminiumoxid/Titandioxid ($Al_2O_3$:$TiO_2$=60:40, solid solution) produced by ceram GmbH was replaced as a metal salt with Aluminiumoxid/Titandioxid ($Al_2O_3$:$TiO_2$=99:1, solid solution). The operations produced a laminated porous film 3, a nonaqueous electrolyte secondary battery member 3, and a nonaqueous secondary battery 3. Further, methods similar to those used in Example 1 were used to measure physical properties of the three products, Table 1 shows the results.

Example 4

Operations similar to those of Example 1 were carried out except that Aluminiumoxid/Titandioxid ($Al_2O_3$:$TiO_2$=60:40, solid solution) produced by ceram GmbH was replaced as a metal salt with a metal salt mixture containing $Al_2O_3$ and $MgCO_3$ at a weight ratio of 99:1. The operations produced a laminated porous film 4, a nonaqueous electrolyte secondary battery member 4, and a nonaqueous secondary battery 4. Further, methods similar to those used in Example 1 were used to measure physical properties of the three products. Table 1 shows the results.

Comparative Example 1

Operations similar to those of Example 1 were carried out except that Aluminiumoxid/Titandioxid ($Al_2O_3$:$TiO_2$=60:40, solid solution) produced by ceram GmbH was replaced as a metal salt with magnesium oxide (produced by Kyowa Chemical Industry Co., Ltd.; product name: Pyrokisuma [registered trademark] 500-04R). The operations produced a laminated porous film 5, a nonaqueous electrolyte secondary battery member 5, and a nonaqueous secondary battery 5. Further, methods similar to those used in Example 1 were used to measure physical properties of the three products. Table 1 shows the results.

Comparative Example 2

Operations similar to those of Example 1 were carried out except that Aluminiumoxid/Titandioxid ($Al_2O_3$:$TiO_2$=60:40, solid solution) produced by ceram GmbH was replaced as a metal salt with high purity alumina (produced by Sumitomo Chemical Co., Ltd.; product name: AA-03). The operations produced a laminated porous film 6, a nonaqueous electrolyte secondary battery member 6, and a nonaqueous secondary battery 6. Further, methods similar to those used in Example 1 were used to measure physical properties of the three products. Table 1 shows the results.

Comparative Example 3

Operations similar to those of Example 1 were carried out except that Aluminiumoxid/Titandioxid ($Al_2O_3$:$TiO_2$=60:40, solid solution) produced by ceram GmbH was replaced as a metal salt with magnesium carbonate. The operations produced a laminated porous film 7, a nonaqueous electrolyte secondary battery member 7, and a nonaqueous secondary battery 7. Further, methods similar to those used in Example 1 were used to measure physical properties of the three products. Table 1 shows the results.

TABLE 1

| | Metal salt (metal oxide) fine particles (filler kind) | Lewis acid peak area per unit weight [$g^{-1}$] | Discharge rate characteristic [20 C/0.2 C] |
|---|---|---|---|
| Example 1 | $Al_2O_3$:$TiO_2$ = 60/40 (solid solution) | 0.38 | 53 |
| Example 2 | $Al_2O_3$:$TiO_2$ = 85/15 (solid solution) | 0.91 | 49 |
| Example 3 | $Al_2O_3$:$TiO_2$ = 99/1 (solid solution) | 1.80 | 46 |
| Example 4 | $Al_2O_3$:$MgCO_3$ = 99:1 (mixture) | 3.00 | 40 |
| Comparative Example 1 | MgO | Not detected(*) (*0) | 7 |
| Comparative Example 2 | $Al_2O_3$ (AKP3000, AA03) | 3.75 | 32 |
| Comparative Example 3 | $MgCO_3$ | 4.90 | 20 |

*No peak was observed in the region of 1447 $cm^{-1}$ to 1460 $cm^{-1}$ of the infrared transmission spectrum measured.

[Conclusion]

Table 1 shows that the nonaqueous electrolyte secondary battery laminated separators produced in Examples 1 through 4 (each of which included a porous layer containing fine metal salt particles having a Lewis acid peak area within a range of not less than 0.2 $g^{-1}$ and not more than 3.6 $g^{-1}$ per unit weight) each allowed a nonaqueous electrolyte secondary battery including the separator to have an improved discharge rate characteristic (discharge output characteristic) as compared to the nonaqueous electrolyte secondary battery laminated separators produced in Comparative Examples 1 through 3 (each of which included a porous layer containing fine metal salt particles having a Lewis acid peak area outside the above-range per unit weight).

The discharge rate characteristic was improved as described above presumably by appropriately adjusting the affinity between the electrolyte solvent and the fine metal salt particles inside the porous layer of the nonaqueous electrolyte secondary battery laminated separator, which in turn appropriately adjusted the progress of desolvation of cations ($Li^+$) inserted into the cathode. This means that even in a case where an insulating porous layer containing fine metal salt particles having a Lewis acid peak area within a range of not less than 0.2 $g^{-1}$ and not more than 3.6 $g^{-1}$ per unit weight is used alone as a nonaqueous electrolyte secondary battery separator, a nonaqueous electrolyte secondary battery including the nonaqueous electrolyte secondary battery insulating porous layer integrated therein as a separator should be similar to the nonaqueous electrolyte secondary batteries produced in the Examples in terms of the amount of (i) generation of cracked gas of electrolyte solution solvent molecules and (ii) side reactions such as polarisation of electrolyte solution solvent molecules, both of which lead to a decrease in the progress of desolvation of cations (lithium ions) near the cathode and degradation in battery characteristics. Therefore, a nonaqueous electrolyte secondary battery insulating porous layer in the form of an insulating porous layer containing fine metal salt particles having a Lewis acid peak area within a range of not less than 0.2 $g^{-1}$ and not more than 3.6 $g^{-1}$ per unit weight should, as a nonaqueous electrolyte secondary battery separator, allow a nonaqueous electrolyte secondary battery including the nonaqueous electrolyte secondary battery insulating porous layer integrated therein to have an improved output characteristic.

INDUSTRIAL APPLICABILITY

The nonaqueous electrolyte secondary battery insulating porous layer, the nonaqueous electrolyte secondary battery laminated separator, and the nonaqueous electrolyte secondary battery member of an embodiment of the present invention are usable in production of a nonaqueous electrolyte secondary battery having an excellent output characteristic.

The invention claimed is:

1. A laminated separator for a nonaqueous electrolyte secondary battery, the laminated separator comprising:
   a porous film containing a polyolefin at a proportion of not less than 50% by volume; and
   an insulating porous layer disposed on one or both surfaces of the porous film,
   the insulating porous layer containing a fine particle of a metal salt,
   the metal salt having a Lewis acid peak area per unit weight within a range of not less than 0.2 $g^{-1}$ and not more than 3.6 $g^{-1}$, the Lewis acid peak area per unit weight being measured by an infrared spectroscopy-based acid nature evaluation method for a solid surface,
   the insulating porous layer having a component volume per unit area for each surface within a range of 0.5 $cm^3/m^2$ to 20 $cm^3/m^2$,
   the fine particle of the metal salt having a volume-based particle size distribution having a first peak and a second peak, wherein the first peak corresponds to a particle size of not less than 0.4 μm and not more than 0.6 μm and the second peak corresponds to a particle size of not less than 5 μm and not more than 7 μm, wherein the first peak has a minus sieve cumulative distribution of not less than 10% and not more than 20%, and wherein the second peak has a minus sieve distribution of not less than 60% and not more than 80%,
   a Lewis acid peak area of a metal salt per unit weight being defined as a value resulting from dividing (i) an area of a peak present in a region of 1447 $cm^{-1}$ to 1460 $cm^{-1}$ of an infrared (IR) absorption spectrum measured of a sample on which pyridine was adsorbed and then desorbed by (ii) a weight of the metal salt;
   the infrared (IR) absorption spectrum being measured by (I) obtaining a background spectrum by measuring an infrared transmission spectrum of the fine particle of the metal salt on which fine particle pyridine has not been adsorbed, (II) preparing a sample by causing pyridine to be adsorbed on the fine particle of the metal salt and then desorbing the pyridine which has been physically adsorbed, (III) measuring an infrared transmission spectrum of the sample, and (IV) subtracting the background spectrum from the infrared transmission spectrum;

wherein the peak area is an area of a portion surrounded by (a) a peak which is present in the region of 1447 $cm^{-1}$ to 1460 $cm^{-1}$ of the infrared (IR) absorption spectrum and (b) a baseline which is drawn to pass through opposite ends of the peak, and wherein the component volume per unit area is defined as the sum of values each resulting from multiplying a weight per unit area of the insulating porous layer by a weight concentration of each component of the insulating porous layer to obtain a weight per unit area of each component; and dividing the weight per unit area of each component by a true specific gravity of each component.

2. The laminated separator according to claim 1, wherein
the fine particle contains titanium oxide.

3. The laminated separator according to claim 1, wherein
the fine particle contains elemental aluminum and elemental titanium.

4. The laminated separator according to claim 1, wherein
the metal salt is at least partially in a form of a solid solution.

5. The laminated separator according to claim 1, wherein
the fine particle is a ground product.

6. The laminated separator according to claim 1, wherein
the fine particle contains a mixture of two or more kinds of metal salts.

7. A nonaqueous electrolyte secondary battery member, comprising:
a cathode;
a laminated separator according to claim 1; and
an anode,
the cathode, the laminated separator, and the anode being arranged in that order.

8. A nonaqueous electrolyte secondary battery, comprising:
a laminated separator according to claim 1.

9. The laminated separator according to claim 1, wherein the insulating porous layer contains a polyolefin, a fluorine-containing resin, a fluorine-containing rubber, an aromatic polyamide, a fully aromatic polyamide (aramid resin), a rubber, a resin with a melting point or glass transition temperature of not lower than 180° C., or a resin made of a water-soluble polymer.

10. The laminated separator according to claim 1, wherein the insulting porous layer comprises at least one resin selected from the group consisting of aromatic polyamides and fully aromatic polyamides.

11. An insulating porous layer for a nonaqueous electrolyte secondary battery, the insulating porous layer comprising
a fine particle of a metal salt,
the metal salt having a Lewis acid peak area per unit weight within a range of not less than 0.2 $g^{-1}$ and not more than 3.6 $g^{-1}$, the Lewis acid peak area per unit weight being measured by an infrared spectroscopy-based acid nature evaluation method for a solid surface,
the insulating porous layer having a component volume per unit area within a range of 0.5 $cm^3/m^2$ to 20 $cm^3/m^2$, the fine particle of the metal salt having a volume-based particle size distribution having a first peak and a second peak, wherein the first peak corresponds to a particle size of not less than 0.4 µm and not more than 0.6 µm and the second peak corresponds to a particle size of not less than 5 µm and not more than 7 µm, wherein the first peak has a minus sieve cumulative distribution of not less than 10% and not more than 20%, and wherein the second peak has a minus sieve distribution of not less than 60% and not more than 80%, a Lewis acid peak area of a metal salt per unit weight being defined as a value resulting from dividing (i) an area of a peak present in a region of 1447 $cm^{-1}$ to 1460 $cm^{-1}$ of an infrared (IR) absorption spectrum measured of a sample on which pyridine was adsorbed and then desorbed by (ii) a weight of the metal salt, the infrared (IR) absorption spectrum being measured by (I) obtaining a background spectrum by measuring an infrared transmission spectrum of the fine particle of the metal salt on which fine particle pyridine has not been adsorbed, (II) preparing a sample by causing pyridine to be adsorbed on the fine particle of the metal salt and then desorbing the pyridine which has been physically adsorbed, (III) measuring an infrared transmission spectrum of the sample, and (IV) subtracting the background spectrum from the infrared transmission spectrum, wherein the peak area is an area of a portion surrounded by (a) a peak which is present in the region of 1447 $cm^{-1}$ to 1460 $cm^{-1}$ of the infrared (IR) absorption spectrum and (b) a baseline which is drawn to pass through opposite ends of the peak, and wherein the component volume per unit area is defined as the sum of values each resulting from multiplying a weight per unit area of the insulating porous layer by a weight concentration of each component of the insulating porous layer to obtain a weight per unit area of each component; and dividing the weight per unit area of each component by a true specific gravity of each component.

12. The insulating porous layer according to claim 11, wherein
the fine particle contains titanium oxide.

13. The insulating porous layer according to claim 11, wherein
the fine particle contains elemental aluminum and elemental titanium.

14. The insulating porous layer according to claim 1, wherein
the metal salt is at least partially in a form of a solid solution.

15. The insulating porous layer according to claim 1, wherein
the fine particle is a ground product.

16. The insulating porous layer according to claim 1, wherein
the fine particle contains a mixture of two or more kinds of metal salts.

17. A nonaqueous electrolyte secondary battery member, comprising:
a cathode;
an insulating porous layer according to claim 11; and
an anode,
the cathode, the insulating porous layer, and the anode being arranged in that order.

18. A nonaqueous electrolyte secondary battery, comprising:
an insulating porous layer according to claim 11.

19. The insulating porous layer according to claim 11, wherein the insulating porous layer contains a polyolefin, a fluorine-containing resin, a fluorine-containing rubber, an aromatic polyamide, a fully aromatic polyamide (aramid resin), a rubber, a resin with a melting point or glass transition temperature of not lower than 180° C., or a resin made of a water-soluble polymer.

20. The insulating porous layer according to claim 11, further comprising at least one resin selected from the group consisting of aromatic polyamides and fully aromatic polyamides.

* * * * *